United States Patent [19]

Provan et al.

[11] Patent Number: 4,867,632
[45] Date of Patent: Sep. 19, 1989

[54] APPARATUS FOR DENESTING AND FEEDING CARTONS TO A CONVEYOR

[75] Inventors: Alexander R. Provan, Canandaigua; David G. Vanderlee, Macedon, both of N.Y.

[73] Assignee: Mobil Oil Corporation, New York, N.Y.

[21] Appl. No.: 45,504

[22] Filed: May 4, 1987

[51] Int. Cl.⁴ ............................................. B65G 59/10
[52] U.S. Cl. .................................. 414/797.9; 221/222; 221/251; 414/795.7
[58] Field of Search ........................ 221/75, 222, 251; 414/94, 125, 129, 797.7, 795.7

[56] References Cited

U.S. PATENT DOCUMENTS

| 1,634,566 | 7/1927 | Wessman | 221/222 |
| 2,659,522 | 11/1953 | Ninneman et al. | 221/222 X |
| 3,193,139 | 7/1965 | Iannone et al. | 222/251 X |
| 3,843,019 | 10/1974 | Medendorp | 221/225 |
| 3,935,967 | 2/1976 | Doucette | 221/222 |
| 4,048,915 | 9/1977 | Martin | 221/222 X |
| 4,288,003 | 9/1981 | Fries, Jr. | 221/222 X |
| 4,625,905 | 12/1986 | Mangla | 229/2.5 EC |
| 4,625,906 | 12/1986 | Mangla | 229/45 EC |

Primary Examiner—Robert J. Spar
Assistant Examiner—Janice Krizek
Attorney, Agent, or Firm—Alexander J. McKillop; Charles J. Speciale

[57] ABSTRACT

Apparatus for sequentially removing articles from a stack of nested articles and for controlling their movement to a location remote from the stack. The apparatus is particularly suited for denesting and feeding large multiple cell cartons such as eighteen cell cartons to a conveyor for subsequent printing. The cartons are placed in a vertical stack and the stack of nested cartons is supported by a set of rotary brushes on opposite sides at the bottom of the stack. The cartons are preseparated and sequentially fed by a second set of rotary brushes from the bottom of the stack to a denesting station. The height of the stack of cartons at the denesting station is sensed by a photoelectric eye for controlling the rotation of the sets of brushes and the feed of cartons to the denesting station. A pair of counter-rotating feed screws having multiple operating sections denest the cartons at the denesting station and sequentially feed them to a conveyor.

8 Claims, 5 Drawing Sheets

PRIOR ART

APPARATUS FOR DENESTING AND FEEDING CARTONS TO A CONVEYOR

BACKGROUND OF THE INVENTION

This invention relates to an apparatus and method for sequentially removing articles from a stack of nested articles and for controlling their movement to a location remote from the stack.

The method and apparatus of the present invention is particularly suited for denesting and feeding large multiple cell cartons, such as eighteen cell egg cartons, to a conveyor for subsequent printing operation. Examples of eighteen cell egg cartons are disclosed in the U.S. Pat. Nos. 4,625,905, and 4,625,906 of Raj K. Mangla. Cartons of this type may be made of wood pulp or, more recently, formed from sheets of plastic material by a thermoforming process. After the cartons have been formed, it is the practice to print the top surface of the cover with a suitable wording and/or design. Eighteen cell egg cartons are substantially larger than twelve cell egg cartons and thus are more difficult to handle on an automatic assembly line. After the cartons have been thermoformed they are nested one within the other into high vertical stacks where they are stored for subsequent operations. In order to perform the subsequent operations it is necessary to denest the cartons from the stacks. This operation has been performed in the past by the use of a pair of feed screws through which the cartons are sequentially fed. The feed screws had the same thread and rotated in the same direction. Such feed screws have been satisfactory for denesting twelve cell egg cartons, however, they have left considerable to be desired with regard to denesting eighteen cell egg cartons.

It is an object of the present invention to provide a method and apparatus for sequentially removing articles from a stack of nested articles and for controlling their movement to a location remote from the stack and doing so in a manner suitable for automation.

SUMMARY OF INVENTION

In accordance with one aspect of the invention there is provided a method for sequentially removing articles from a stack of nested articles and for controlling their movement to a location remote from the stack. The method comprises the steps of placing a plurality of nested articles in a vertical stack and supporting the stack of nested articles on opposite sides at the bottom of the stack. The method further includes preseparating and sequentially feeding the nested articles at the bottom of the stack to a denesting station and sensing the height of the stack of articles at the denesting station for controlling the feed of articles to the denesting station and denesting the articles at the denesting station and sequentially feeding them to a conveyor.

It is a further object of the invention to provide a method for denesting and feeding cartons to a conveyor including the steps of placing a plurality of nested cartons in a vertical stack and supporting the stack of nested cartons on opposite sides at the bottom of the stack. The method further includes the steps of preseparating and feeding the nested cartons from the bottom of the stack to a pair of feed screws having grooves of opposite hand positioned in a spaced relation to receive the opposite ends of the cartons, the axis of the feed screws being tilted with respect to the vertical axis of the stack to compensate for the lead angle of the feed screws so that the cartons ride flat in the grooves of the feed screws to allow a wider variation and thickness of the cartons at the screw pick up points. The method further includes rotating the feed screws in counter directions and engaging a plurality of the cartons in a first section of the feed screws having a pitch matching the spacing of the nested cartons for distributing the weight of the stack of cartons over a plurality of cartons rather than only on the bottom carton of the stack to avoid distortion of the carton and permitting the lead edge of the feed screws to enter the nested stack without damaging the cartons. The method further includes moving the cartons into a second section of the feed screws having an increased pitch serving to separate the bottom-most carton from the stack thereby causing the carton to tip slightly whereby the carton is out of parallel with the conveyor upon which the carton is to be placed. The method further includes moving the carton to a third section of the feed screws where the groove pitch is zero for 120° of screw rotation to cause the carton to level out parallel with the conveyor upon which the carton is to be placed and moving the carton to a fourth section of the feed screws where the pitch is substantially equal to the pitch of the first section of the feed screws thereby giving the carton a downward kick onto the conveyor.

It is a further object of the invention to provide apparatus for sequentially removing articles from a stack of nested articles and for controlling their movement to a location remote from the stack. The apparatus comprises supporting means for supporting a plurality of the nested articles in a vertical stack and feeding means positioned beneath the supporting means for preseparating and sequentially feeding the nested articles from the bottom of the stack. The apparatus further includes denesting means positioned beneath the feeding means to receive the nested articles from the feeding means, the denesting means comprising a pair of feed screws positioned in spaced relation to receive opposite ends of the articles for support therebetween, each of the feed screws being of the opposite hand, and means for counter-rotating the feed screws.

In accordance with one aspect of the invention, the supporting means comprises first rotary brush wheels positioned in spaced relation to receive opposite ends of the articles for support therebetween and the feeding means comprises second rotary brush wheels positioned in spaced relation to receive opposite ends of the articles from the first rotary brush wheels. Means is also provided for rotating the second rotary brush wheels at a higher speed than the first rotary brush wheels whereby as the stack of articles passes through the first rotary brush wheels, the second rotary brush wheels due to the higher rotational speed preseparate the articles in presenting them to the feed screws.

In accordance with another aspect of the invention there is provided means for sensing the height of the stack of articles on the feed screws, and means responsive to the sensing means for controlling the drive of the first and second brush wheels whereby a substantially uniform weight of articles rests on the feed screws during the operation of the apparatus thereby reducing the deformation of the articles from the weight of the stack.

In accordance with a further aspect of the invention each of the feed screws is provided with four different operating sections, the pitch in the first section of each feed screw matching the spacing of the nested articles, the length 10 of the first section of each feed screw being sufficient to engage a plurality of the nested articles before any separation action of the feed screws begins so as to distribute the weight of the articles over a plurality of articles rather than only the bottom article of the stack thereby avoiding distortion of the articles and permitting the leading edge of the feed screws to enter the nested stack. Each of the feed screws has a second section having an increased pitch for separating the bottom-most article of the stack and each of the feed screws has a third section in which the groove pitch is zero for 120° rotation Each of the feed screws has a fourth section with a pitch approximately equal to the pitch of the first section, the axis of each feed screw being inclined with respect to the vertical axis of the stack so that the grooves in the first section are substantially horizontal whereby the articles ride substantially flat in the grooves.

The foregoing and other objects, features and advantages of the invention will be better understood from the following, more detailed description and appended claims.

DESCRIPTION OF THE PREFERRED EMBODIMENT

Figure 1:
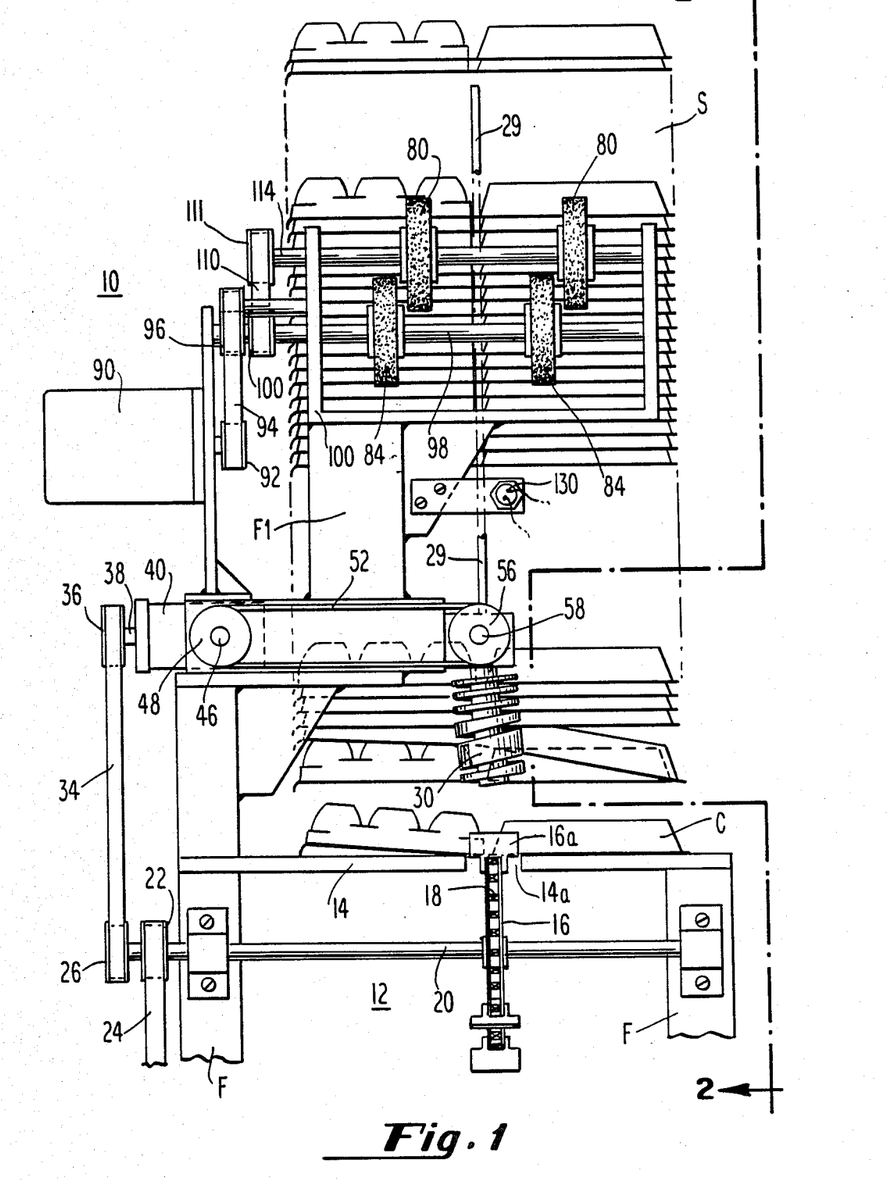
FIG. 1 is a side elevational view of apparatus for sequentially removing articles from a stack of nested articles and for controlling their movement to a location remote from the stack embodying the present invention.
Figure 2:
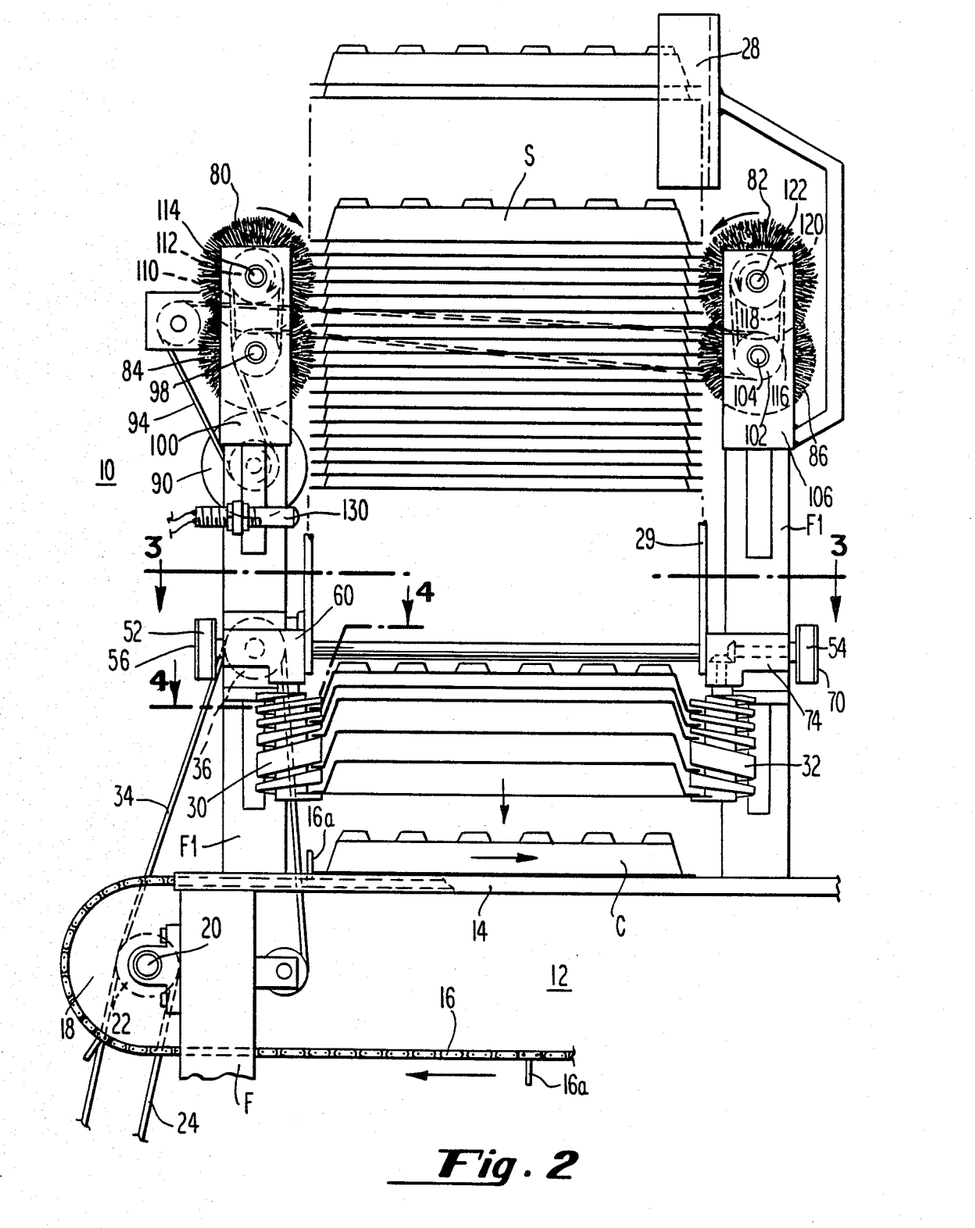
FIG. 2 is a front elevational view taken along the line 2—2 in FIG. 1.

As pointed out above, the present invention is directed to apparatus for sequentially removing articles from a stack of nested articles and for controlling their movement to a location remote from the stack. The preferred embodiment illustrated in the drawings will be described in connection with apparatus for denesting and feeding egg cartons to conveyor for subsequent printing. Egg cartons come in both 12-cell and 18-cell sizes. The 18-cell sizes are particularly difficult to denest and feed due to their large size. The present invention is particularly suited for handling 18-cell egg cartons As shown in FIGS. 1 and 2, the apparatus 10 is mounted on a frame F of a conveyor 12 which is adapted to transport cartons C sequentially to a printing station where the tops or covers of the cartons are provided with the appropriate printing. As may be seen at the top of FIGS. 1 and 2, the apparatus 10 has been provided with a stack S of nested cartons C which it is desired to denest and feed to the conveyor 12. The conveyor 12 includes a table 14 having a slot 14a extending lengthwise thereof and through which is adapted to extend a conveyor chain 16. The conveyor chain 16 is provided with upstanding lugs 16a which are adapted to engage the trailing end of a carton C and move it lengthwise of the conveyor 12 to a printing station, not shown. The lugs 16a are disposed at spaced locations along the conveyor chain 16 and the conveyor chain 16 is driven from a sprocket wheel 18 mounted on a shaft 20 which in turn is driven from a pulley 22 and a belt 24 connected to a suitable driving motor, not shown. Also mounted on the shaft 20 is a pulley 26 that is adapted to supply the driving power to the denesting apparatus as hereinafter described.

Figure 3:
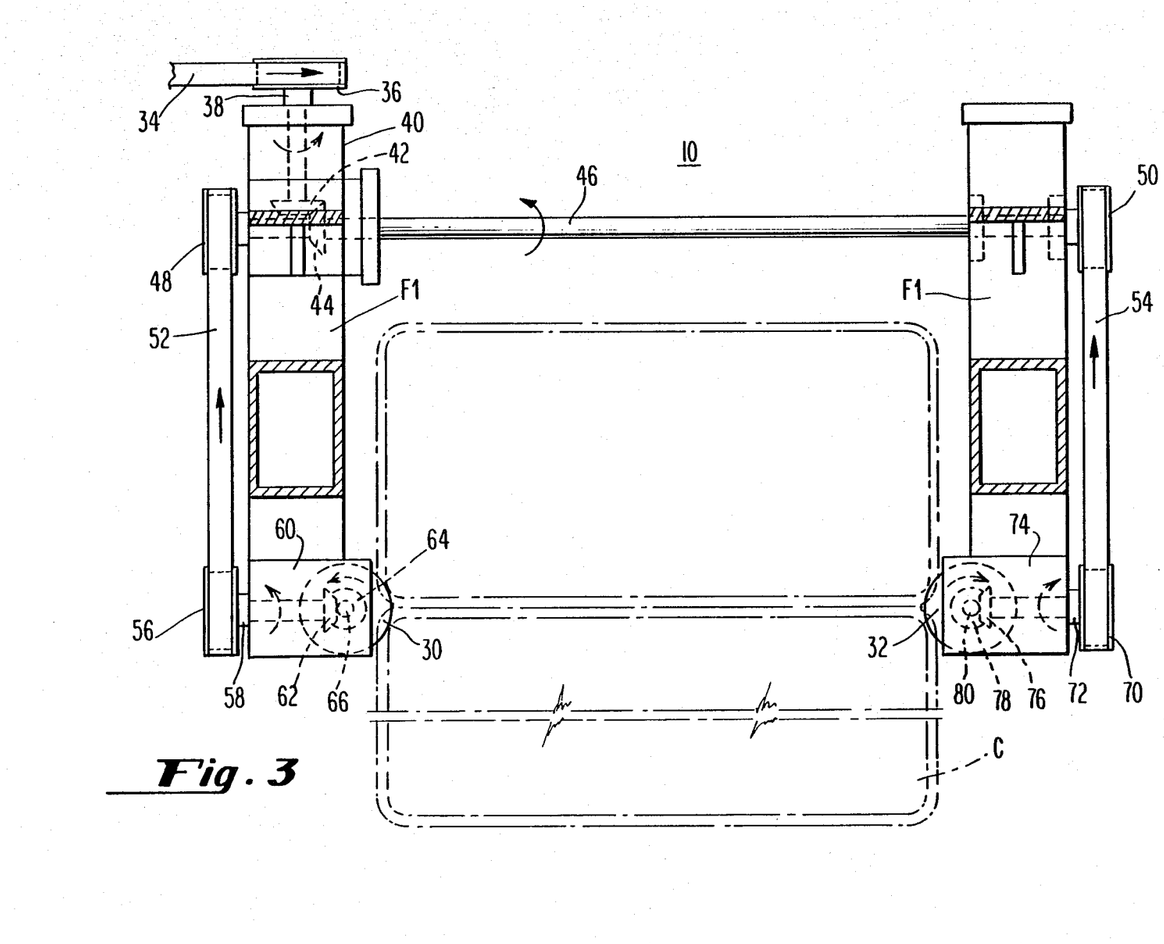
FIG. 3 is a horizontal sectional view taken along the line 3—3 in FIG. 2.
Figure 4:
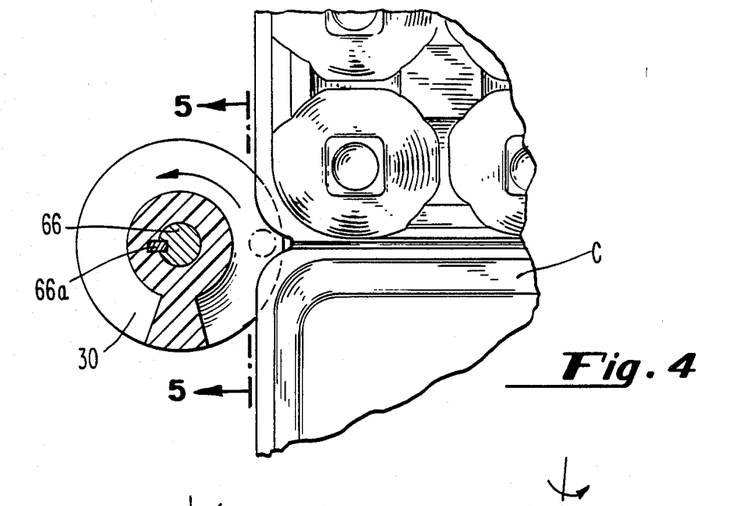
FIG. 4 is a fractional sectional view on enlarged scale taken along the line 4—4 in FIG. 2.
Figure 7:
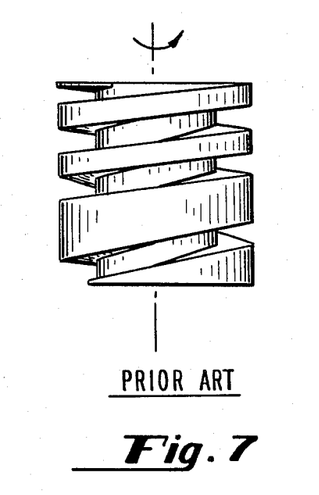
FIG. 7 is an elevational view of a feed screw used in the prior art.

As shown in FIGS. 1 and 2, the cartons C are placed in the apparatus 10 in a vertical stack S and supported by a U-shaped guide 28 mounted on a vertical frame F1. A pair of guide shoes 29, one on each side of the stack S are provided at the hinge area to help stabilize the vertical stack, one of the guide shoes 29 is shown in FIG. 1. At the bottom of the apparatus 10 are located two feed screws 30 and 32, one at each end of the carton C at the hinged area. This is best shown in FIGS. 2 and 3. The feed screws 30 and 32 are of opposite hand and are counter-rotating as distinguished from prior egg carton denesting apparatus where the feed screws rotated in the same direction. A prior art feed screw is shown in FIG. 7. The purpose of the counter-rotation and the design of the novel feed screws will hereinafter be described. The drive for the counter-rotating feed screws 30 and 32 is derived from the pulley 26 on the continuously driven shaft 20 of the conveyor 12, FIG. 1. A belt 34 connects the driving pulley 26 with a pulley 36 mounted on a shaft 38 extending from a right angle gear box 40 on the apparatus 10, FIG. 3. The opposite end of shaft 38 is provided with a bevel gear 42 which is adapted to mesh with a bevel gear 44 mounted on a shaft 46 which is journaled between the side frames F1, F1 of the apparatus 10. The ends of the shaft 46 are each provided with pulleys 48 and 50 over which pass drive belts 52 and 54 respectively. The belt 52 passes over a pulley 56 on the end of a shaft 58 extending from a right angle gear box 60. The opposite end of the shaft 58 is provided with a bevel gear 62 which is adapted to mesh with a bevel gear 64 fixed to the shaft 66 of the feed screw 30. As shown in FIG. 4, the shaft 66 may be keyed to the feed screw 30 by a key 66a or other suitable means. The drive for the feed screw 32 is provided in similar manner. As shown in FIG. 3 the belt 54 passes over a pulley 70 mounted on one end of a shaft 72 extending from a right angle gear box 74. The opposite end of the shaft 72 is provided with a bevel gear 76 which in turn meshes with a bevel gear 78 fixed to a shaft 80 of the feed screw 32.

From the foregoing it will be seen that the drive for both of the feed screws 30 and 32 is derived from the belt 34, pulley 36 and shaft 38 to the right angle gear box 40. The right angle gear box 40 drives the shaft 46 having the pulleys 48 and 50 at its opposite ends. The drive for the feed screw 30 is derived from the pulley 48, belt 52, pulley 56, shaft 58 and the right angle gear box 60. The drive for the feed screw 32 is derived from the pulley 50, the belt 54, the pulley 70, the shaft 72 and the right angle gear box 74. The directions of rotation of the various parts are illustrated in FIG. 3 by the respective arrows associated with those parts. It will be noted that the resulting direction of rotation of the feed screw 30 is in a counterclockwise direction while the resulting direction of rotation of the feed screw 32 is in a clockwise direction.

Figure 5:
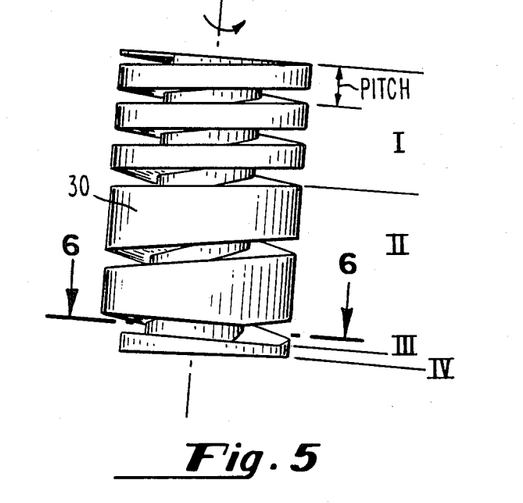
FIG. 5 is a side elevation of the feed screw taken along the line 5—5 in FIG. 4.
Figure 6:
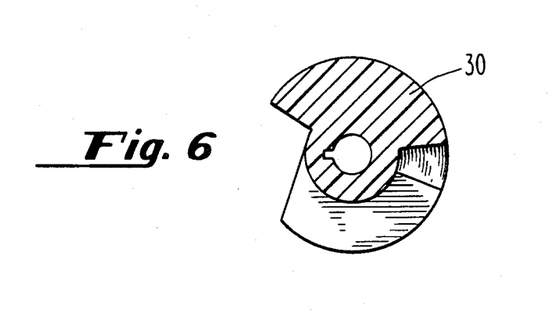
FIG. 6 is a sectional view taken along the line 6—6 in FIG. 5.

As pointed out above, the cartons C are placed in the denesting apparatus 10 in a vertical stack S. At the bottom of the apparatus 10 are located the two feed screws 30 and 32, one at each end of the carton at the hinge area as shown in FIGS. 2 and 3. The novel feed screws 30 and 32 are the same except that they are of the opposite hand since they rotate in opposite directions. A detailed description of the feed screws will now be given in connection with feed screw 30 illustrated in FIGS. 4–6. Each of the feed screws 30 and 32 is a single component with four different operating sections I–IV. The pitch in the first section I of each screw is so designed as to match the spacing of the nested cartons C. Four or five cartons are engaged in the screws 30 and 32 before any separation action of the screws begins. This serves the purpose of distributing the weight of the stack of the cartons over four or five cartons rather than only the bottom carton of the stack. In this way, distortion or bending of the carton, which is soft, is avoided, and the lead edge of the screw can enter the nested stack without malfunction. It will also be noted in FIG. 5 that the axis of the feed screw 30 is tilted from the vertical so that the grooves in section I are horizontal. This compensates for the lead angle of the screw 30 and results in the cartons riding flat in the groove and allows a wider variation in thickness of the carton at the screw pick up points.

The second section II of the screw 30 has an increased pitch which serves to separate the bottom-most carton from the stack, because of the lead angle of the pitch, the carton is tipped slightly while traveling through this portion of the screw and is not parallel with the conveyor deck 14 upon which it will be placed. In the third section III of the screw 30, the groove pitch is zero for 120° of screw rotation. This causes the carton to level out parallel with the conveyor deck 14, and also exerts the force necessary to break loose the outermost row of cells in the egg carton C. Heretofore, this has been a problem in obtaining satisfactory high-speed 18-cell denesting. The fourth section IV of the screw 30 is a slight pitch, preferably equal to the first pitch, which gives the carton a slight downward "kick" onto the conveyor 12 below. As pointed out above and as illustrated in FIGS. 2 and 3, the screws 30 and 32 are counter-rotating as opposed to prior egg carton denesters where the screws rotated in the same direction. An example of a prior art feed screw is illustrated in FIG. 7. It will be noted that the axis of the prior art screw is vertical and is not tilted at an angle as shown in the novel screw 30 illustrated in FIG. 5. By reason of the novel feed screw design in the present invention and by counter-rotating the feed screws, the opposing faces of the feed screws 30 and 32, FIGS. 2 and 3, where the cartons are located, are parallel, eliminating a twisting force that is exerted on the carton in the prior denesters during the travel of the cartons through the screw grooves.

Referring to FIGS. 1 and 2, it will be seen that in apparatus 10 there is located a short distance above the feed screws 30 and 32, for example, about 12-14 inches, two sets of rotary brush wheels and each set comprising two pairs of rotary brush wheels with one brush wheel in each pair engaging one side of the cartons C. For example, as shown in FIGS. 1 and 2 the top set of brushes comprises a pair of brushes 80, 80 disposed on one side of the stack of cartons and a pair of brushes 82, 82 on the opposite side of the stack. Beneath the top set of rotary brush wheels is a set of lower brush wheels comprising two pairs of brushes 84, 84 and 86, 86. As may be seen in FIG. 2, the top set of brushes 80 and 82 are adapted to isolate all of the apparatus below it from the weight of the stack of incoming cartons. It also will be noted that the pair of brushes 80,80 in the top set rotate in the opposite direction from the pair of brushes 82,82 in the top set of brush wheels. It will also be noted that the pair of brushes 84,84 in the lower set of brush wheels rotate in the counter direction to the pair of brush wheels 86,86 in the lower set of brush wheels.

The drive for the upper and lower sets of brush wheels is provided by a motor and clutch-brake mechanism 90 having an output pulley 92 over which passes a drive belt 94. The belt 94 drives a pulley 96 mounted on a shaft 98 on which are mounted the pair of brush wheels 84,84. The ends of the shaft 98 are journaled in an upstanding support member 100. As shown in FIG. 2, the belt 94 also passes over a pulley 102 mounted on shaft 104 on which are mounted the pair of brush wheels 86,86. The opposite ends of the shaft 104 are journaled in an upstanding support 106. The drive for the top set of brushes is also derived from the motor and clutch-brake unit 90. As may be seen in FIG. 1 a second pulley 100 is mounted on the shaft 98 adjacent the pulley 96. A belt 110 passes over pulley 100 and also over a pulley 111 mounted on one end of a shaft 114. The pair of rotary brushes 80,80 are mounted on the shaft 114, the opposite ends of which are journaled in the upstanding support 100. A second pulley 116 is mounted on the shaft 104 behind pulley 102, FIG. 2. A belt 118 passes over the pulley 116 and also over a pulley 120 mounted on a shaft 122. The upper pair of brushes 82,82 are mounted on the shaft 122, the opposite ends of which are journaled in the upstanding support 106.

While the top set of rotary brushes 80,80 and 82,82 are driven from the same motor 90 as the bottom or lower set of rotary brushes 84,84 and 86,86 they are not driven at the same speed. It will be noted in FIG. 2 that the drive pulleys 96 and 102 for the lower brush pairs 84 and 86 have a smaller diameter than the drive pulleys 112 and 120 for the upper brush pairs 80 and 82. Thus the brushes 84 and 86 in the lower brush set travel at a higher speed than the brushes 80 and 82 in the top brush set. The purpose of this will now be explained. As the stack of cartons passes through the top set of brush wheels 80, 82, the lower set of brush wheels 84 and 86, which have a high rotational speed, pre-separates the cartons, "fluffing" those and presenting them to the feed screws 30 and 32. In process handling and storage, there is a strong tendency for the stack of cartons S to "lock" together, making them difficult to separate by feed screws alone. This pre-feeder operation uniformly breaks this locking force holding the cartons together in the stack to facilitate the denesting operation of the feed screws.

Figure 8:
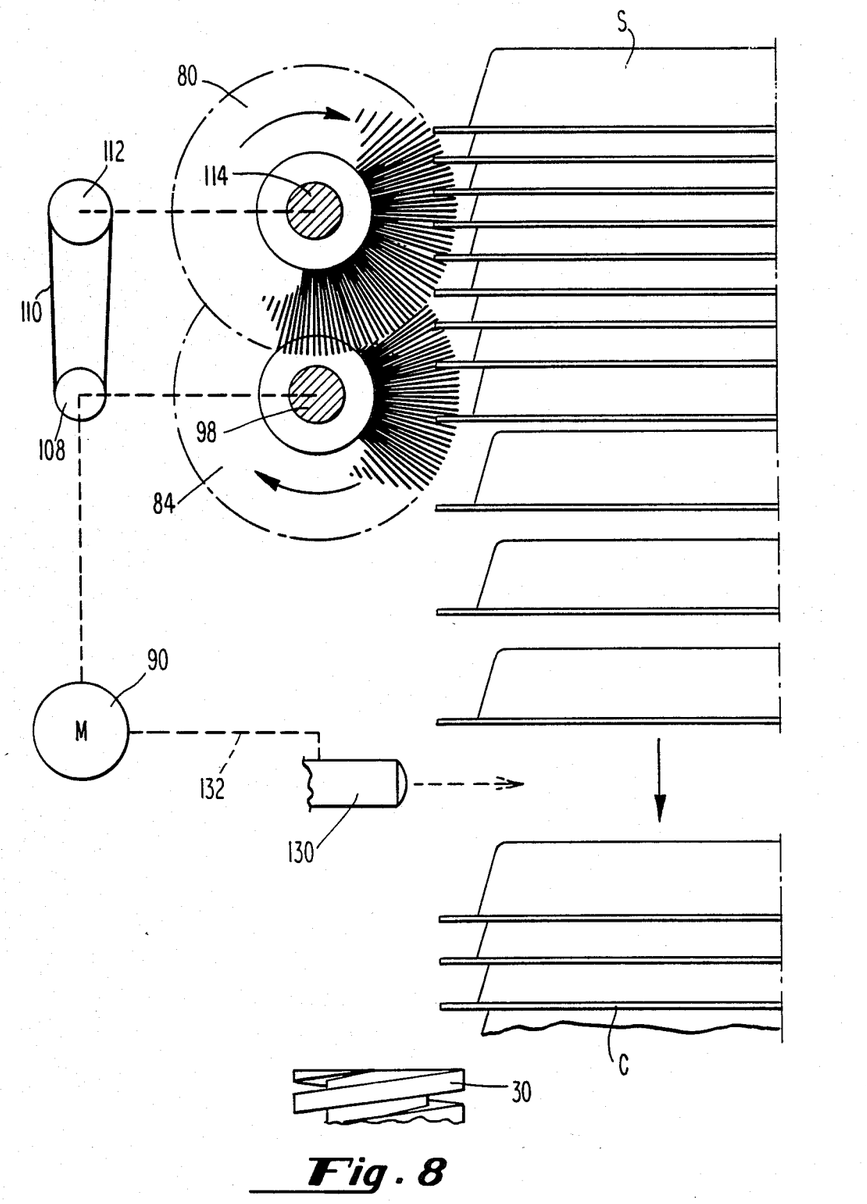
FIG. 8 is a diagrammatic view illustrating the upper and lower brush assemblies and photoelectric eye for sensing the height of the stack of cartons and controlling the brush drive.

As pointed out above, the top and lower brush sets, 80, 82 and 84, 86 are driven from a common motor 90 but at different speeds. The motor 90 includes a clutch-brake mechanism. Such units are available commercially. An example of one such suitable unit is model 5IK90GS-A2FUL/5CGS-01/5GS6K manufactured by Oriental Motor Company. The clutch-brake mechanism is adapted to be operated by a photoelectric eye sensor 130 which is electrically connected to the motor brake unit 90 as indicated by the broken line 132, FIG. 8. As shown in FIGS. 1, 2 and 8, the sensor 130 is mounted on the frame of the apparatus 10 adjacent one side of the stack S of cartons. The sensor 130 is positioned above the feed screws 30, 32 and beneath the lower set of rotary brush wheels 84, 86. As may be seen in FIGS. 1, 2 and 8 the sensor 130 is adapted to sense the height of the stack of cartons on the feed screws 30, 32. The sensor 130 turns on and off the brush drive from motor 90 through its clutch-brake mechanism. When the stack of cartons on the feed screws is above the level of the sensor 130 the clutch brake mechanism is actuated to turn off the brush drive from motor 90 and avoid further feeding of cartons from the upper stack. When the sensor 130 is above the height of the stack of cartons on the feed screws 30, 32, the sensor actuates the clutch-brake mechanism turning on the brush drive from motor 90 and thus feeds additional cartons from the bottom of the stack to the feed screws 30, 32. Thus it will be seen that the sensor 130 enables a substantially uniform weight of cartons to rest on the feed screws 30, 32 at all times, further reducing the deformation of cartons from the weight of the stack. It will also be noted that the top brush set including the pairs 80,80 and 82,82 of brushes isolates all of the mechanism below it from the weight of the incoming stack of cartons. This permits automation of the placement of nested cartons in the printing line denester.

From the foregoing it will be seen that in operation of the apparatus 10, a stack of nested cartons is placed on the top set of rotary brush rolls 80, 82. The sensor 130 actuates the clutch-brake mechanism to enable the drive motor 90 to drive both the upper and lower brush sets thus feeding the cartons downwardly through the apparatus onto the feed screws 30 and 32. As shown in FIG. 8 the lower set of brush rolls 84, 86 by reason of their higher rotational speed from that of the upper set of brush wheels 80,82 pre-separate the cartons, "fluffing38 those and presenting them to the feed screws 30, 32. When the height of the stack of cartons on the feed screws is above the sensor 130, the sensor 130 turns off the brush drive through the clutch-brake mechanism 80 thus stopping further feed of cartons from the brush sets. When the cartons C reach the feed screws 30, 32, the ends of the cartons at the hinge area enter the grooves in the counter-rotating feed screws 30, 32. The axes of the feed screws are tilted with respect to the vertical so that the grooves in section I of the feed screws are horizontal. This compensates for the angle of the screws and results in the cartons C riding flat in the grooves thereby allowing a wider variation in thickness of the cartons at the screw pickup points. The cartons are successively fed downwardly through the grooves of the feed screws 30 and 32 passing through the section I and thereafter entering the second section II which has an increased pitch which serves to separate the bottom-most carton of the stack and because of the lead angle of the pitch, the carton tips slightly while traveling through this section of the screw and is not parallel with the conveyor 12 upon which it will be placed. As pointed out above the third section III of the screw has a groove pitch of zero for 120° of screw rotation thus causing the carton to level out parallel with the conveyor deck and also exerts the force necessary to break loose the outermost row of cells in the egg carton. The fourth section IV of the screw is a slight pitch, preferably equal to the first pitch in section I, and this gives the carton a slight downward "kick" onto the conveyor 12 below.

When the cartons C arrive on the conveyor 12 as shown in FIGS. 1 and 2, the ends of the cartons C are engaged by the lug 16a on the conveyor chain 16 and are moved in succession to a location remote from the stack for subsequent printing or other operations. With an apparatus of the type described herein it has been possible to denest egg cartons of the 18 cell size from a stack of cartons at a rate of about 400 per minute and deliver them to a conveyor for subsequent printing.

While there has been described a preferred embodiment of the invention, it will be understood that further modifications may be made without departing from the spirit and scope of the invention as set forth in the appended claims.

What is claimed is:

1. Apparatus for sequentially removing articles from a stack of nested articles and for controlling their movement to a location remote from the stack comprising:
    (a) supporting means for supporting a plurality of the nested articles in a vertical stack;
    (b) feeding means positioned beneath said supporting means including flexible structure insertable between adjacent articles for pre-separating and sequentially feeding the nested article from the bottom of the stack, said feeding means comprising rotary brush wheels positioned in spaced relation to receive opposite ends of the articles from said supporting means;
    (c) denesting means positioned beneath said feeding means to receive the nested articles from said feeding means, said denesting means comprising a pair of feed screws positioned in spaced relation to receive opposite ends of the articles for support therebetween, each said feed screw being of the opposite hand; and
    (d) means for counter-rotating said feed screws.

2. Apparatus for sequentially removing articles from a stack of nested articles and for controlling their movement to a location remote from the stack comprising:
    (a) supporting means for supporting a plurality of the nested articles in a vertical stack;
    (b) feeding means positioned beneath said supporting means for pre-separating and sequentially feeding the nested articles from the bottom of the stack;
    (c) denesting means positioned beneath said feeding means to receive the nested articles from said feeding means, said denesting means comprising a pair of feed screws positioned in spaced relation to receive opposite ends of the articles for support therebetween, each said feed screw being of the opposite hand; and
    (d) means for counter-rotating said feed screws, wherein said supporting means comprises first rotary brush wheels positioned in spaced relation to receive opposite ends of the articles for support therebetween.

3. Apparatus according to claim 2 wherein said feeding means comprises second rotary brush wheels positioned in spaced relation to receive opposite ends of the articles from said first rotary brush wheels.

4. Apparatus according to claim 3 including means for rotating both of said first and second rotary brush wheels.

5. Apparatus according to claim 4 including means for rotating said second rotary brush wheels at a higher speed than said first rotary brush wheels whereby as the stack of articles passes through said first rotary brush wheels, the second rotary brush wheels due to higher rotational speed preseparate the articles in presenting them to said feed screws.

6. Apparatus according to claim 1 including means for sensing the height of the articles on said denesting means.

7. Apparatus according to claim 5 including means for sensing the height of the stack of articles on said feed screws, and means responsive to said sensing means for controlling the drive of said first and second brush wheels whereby a substantially uniform weight of articles rest on said feed screws during the operation of said apparatus thereby reducing the deformation of the articles from the weight of the stack.

8. Apparatus according to claim 2 wherein each of said feed screws is provided with four different operating sections, the pitch in the first section of each feed screw matching the spacing of the nested articles, the length of the first section of each feed screw being sufficient to engage a plurality of the nested articles before any separation action of the feed screws beings so as to distribute the weight of the articles over a plurality of articles rather than only the bottom article of the stack thereby avoiding distortion of the articles and permitting the lead edge of the feed screws to enter the nested stack, each of the said feed screws having a second section having an increased pitch for separating the bottommost article of the stack, each of said feed screws having a third section in which the groove pitch is zero for 120° of screws rotation, and each of said feed screws having a fourth section with a pitch approximately equal to the pitch of the first section, the axis of said feed screws being inclined with respect to the vertical axis of the stack so that the grooves in said first section are substantially horizontal whereby the articles ride substantially flat in the grooves.

* * * * *